(12) United States Patent
Sawata et al.

(10) Patent No.: US 12,553,389 B2
(45) Date of Patent: Feb. 17, 2026

(54) MULTI SHAFT POWER TRANSFER SYSTEM

(71) Applicant: Hamilton Sundstrand Corporation, Charlotte, NC (US)

(72) Inventors: Tadashi Sawata, Coventry (GB); Aaron Day, Sevenoaks (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/169,797

(22) Filed: Apr. 3, 2025

(65) Prior Publication Data
US 2025/0314205 A1    Oct. 9, 2025

(30) Foreign Application Priority Data

Apr. 3, 2024 (EP) ..................................... 24168307

(51) Int. Cl.
*B64D 27/35* (2024.01)
*F02C 7/32* (2006.01)
*F02C 7/36* (2006.01)

(52) U.S. Cl.
CPC ............... *F02C 7/32* (2013.01); *B64D 27/35* (2024.01); *F02C 7/36* (2013.01); *F05D 2220/323* (2013.01); *F05D 2220/768* (2013.01); *F05D 2260/40311* (2013.01)

(58) Field of Classification Search
CPC . F16H 3/727; B64D 27/35; F02C 7/36; F02C 7/32; F05D 2220/768; F05D 2260/40311
See application file for complete search history.

(56) References Cited

U.S. PATENT DOCUMENTS

| | | | | |
|---|---|---|---|---|
| 5,775,449 | A * | 7/1998 | Moroto | B60K 6/387 903/910 |
| 6,895,741 | B2 | 5/2005 | Rago et al. | |
| 7,513,120 | B2 * | 4/2009 | Kupratis | F02C 3/113 60/788 |
| 8,424,280 | B2 | 4/2013 | Moore et al. | |
| 9,845,734 | B2 * | 12/2017 | Zeiner | F01D 17/06 |
| 10,094,295 | B2 | 10/2018 | Ullyott et al. | |
| 10,208,675 | B2 | 2/2019 | Mackin | |

(Continued)

FOREIGN PATENT DOCUMENTS

FR    3103011 A1    5/2021

OTHER PUBLICATIONS

European Search Report in connection with counterpart European Patent Application No. 24168307.7 dated Oct. 10, 2024, 9 pages.

*Primary Examiner* — Sherry L Estremsky

(57) ABSTRACT

An electrical power-transfer system for an engine includes first and second engine shafts. The system also includes a planetary gear system having a sun gear, a ring gear, a plurality of planetary gears enmeshed with the sun gear and the ring gear, and a carrier supporting the plurality of planetary gears, where the carrier is configured for connection to be driven by the first engine shaft. The system further includes a first electrical machine connected to be driven by the ring gear to generate electrical power, a second electrical machine connected to drive the sun gear, and a third electrical machine configured to receive electrical power generated by the first electrical machine and operable as a motor to drive the second engine shaft.

20 Claims, 4 Drawing Sheets

(56) References Cited

U.S. PATENT DOCUMENTS

| | | | |
|---|---|---|---|
| 10,807,729 B2* | 10/2020 | Vondrell | H02K 7/1823 |
| 11,168,616 B2 | 11/2021 | Kupratis et al. | |
| 11,401,829 B2 | 8/2022 | Molesini et al. | |
| 11,566,567 B2* | 1/2023 | Kupratis | F01D 15/10 |
| 11,629,646 B2 | 4/2023 | Kupratis et al. | |
| 11,745,888 B2 | 9/2023 | Harvey et al. | |
| 11,873,766 B2 | 1/2024 | Kupratis et al. | |
| 2012/0329593 A1* | 12/2012 | Larrabee | F16H 3/72 |
| | | | 903/910 |
| 2019/0145322 A1* | 5/2019 | Sellick | F02C 7/36 |
| | | | 290/52 |
| 2020/0240331 A1 | 7/2020 | Kupratis et al. | |
| 2022/0260019 A1 | 8/2022 | de Wergifosse | |
| 2023/0399983 A1 | 12/2023 | Ganiger et al. | |

\* cited by examiner

MULTI SHAFT POWER TRANSFER SYSTEM

CROSS-REFERENCE TO RELATED APPLICATION AND PRIORITY CLAIM

This application claims priority under 35 U.S.C. § 119 to European Patent Application No. 24168307.7 filed on Apr. 3, 2024, which is hereby incorporated by reference in its entirety.

TECHNICAL FIELD

The present disclosure relates to electrical power-transfer systems for engines, in particular to electrical power-transfer systems for gas turbine engines having two shafts.

BACKGROUND

Gas turbine engines often include multiple engine shafts which are independently rotatable. The shafts generally include turbine, compressor and/or propulsor sections, the aerodynamic designs of which determine the speeds of rotation of the shafts. Engines frequently include a low speed, low pressure shaft and a high speed, high pressure shaft in order to most efficiently compress intake air for combustion and extract energy from engine flow expanding from a combustor.

In certain circumstances, such as particular operating conditions of the engine, it may be possible to operate such an engine more efficiently by extracting power from one shaft and adding the power to the other shaft. Transferring power between spools in this manner can influence the rotational speeds of both shafts to run at more efficient design points.

It may be particularly efficient to transfer power using an electrical system which extracts power from one shaft using a generator and applies power to another shaft using a motor. Such systems might be required to operate efficiently across a range of different engine shaft speeds in order to be effective. At the same time, electrical power-transfer systems can require the use of bulky components which increase engine weight and occupy large amounts of space, decreasing engine efficiency.

There is a need for more lightweight electrical power-transfer systems which can operate efficiently over a wide range of shaft speeds.

SUMMARY

According to a first aspect of the disclosure, there is an electrical power-transfer system for an engine having first and second engine shafts. The system comprises a planetary gear system comprising a sun gear, a ring gear, a plurality of planetary gears enmeshed with the sun gear and the ring gear, and a carrier supporting the plurality of planetary gears, wherein the carrier is configured for connection to be driven by a first engine shaft. The system further comprises a first electrical machine connected to be driven by the ring gear to generate electrical power, a second electrical machine connected to drive the sun gear, and a third electrical machine configured to receive electrical power generated by the first electrical machine and operable as a motor to drive a second engine shaft.

In a further embodiment of the above, the second electrical machine has a constant power speed range which is greater than a constant power speed range of the first electrical machine.

In a further embodiment of any of the above, the first electrical machine is a motor-generator.

In a further embodiment of any of the above, the first electrical machine comprises a surface permanent magnet machine.

In a further embodiment of any of the above, the second electrical machine comprises an interior permanent magnet machine.

In a further embodiment of any of the above, the third electrical machine is a motor-generator.

In a further embodiment of any of the above, the third electrical machine comprises a surface permanent magnet machine.

In a further embodiment of any of the above, the system further comprises a sensor configured to detect a rotation of one or more parts of the planetary gear system and a controller in communication with the sensor, the controller configured to control a speed at which the second electrical machine drives the sun gear in response to the rotation detected by the sensor.

In a further embodiment of any of the above, the sensor is configured to detect a rotation of the ring gear.

According to a further aspect of the disclosure, there is a gas turbine engine comprising a low speed shaft, a high speed shaft, and the system of any of the above embodiments, wherein the carrier is connected to be driven by the low speed shaft and the third electrical machine is connected to drive the high speed shaft.

In a further embodiment of the above, the carrier is connected to be driven by the low speed shaft via a take-off shaft.

In a further embodiment of any of the above, the third electrical machine is connected to drive the high speed shaft via a take-off shaft.

According to a further aspect of the disclosure, there is a method of operating an electrical power transfer system of an engine having first and second engine shafts. The method comprises driving a carrier of a planetary gear system with the first engine shaft, the carrier supporting a plurality of planetary gears enmeshed with a sun gear and a ring gear, the ring gear connected to drive a first electrical machine and the sun gear connected to be driven by a second electrical machine. The method further comprises driving the sun gear with the second electrical machine, generating electrical power with the first electrical machine, and powering, with the electrical power, a third electrical machine in order to drive the second engine shaft.

In a further embodiment of the above, the method further comprises detecting, using a sensor, a rotation of one or more parts of the planetary gear system, and controlling, using a controller in communication with the sensor, a speed at which the second electrical machine drives the sun gear, the step of controlling carried out in response to the detected rotation.

In a further embodiment of any of the above, the engine is a gas turbine engine, the step of driving the carrier with the first engine shaft comprises driving the carrier with a low speed shaft of the gas turbine engine, and the step of powering the third electrical machine in order to drive the second engine shaft comprises powering the third electrical machine in order to drive a high speed shaft of the gas turbine engine.

BRIEF DESCRIPTION OF THE DRAWINGS

A non-limiting embodiment of this disclosure will now be described with reference to the accompanying drawings in which.

DETAILED DESCRIPTION OF THE DRAWINGS

Figure 1:
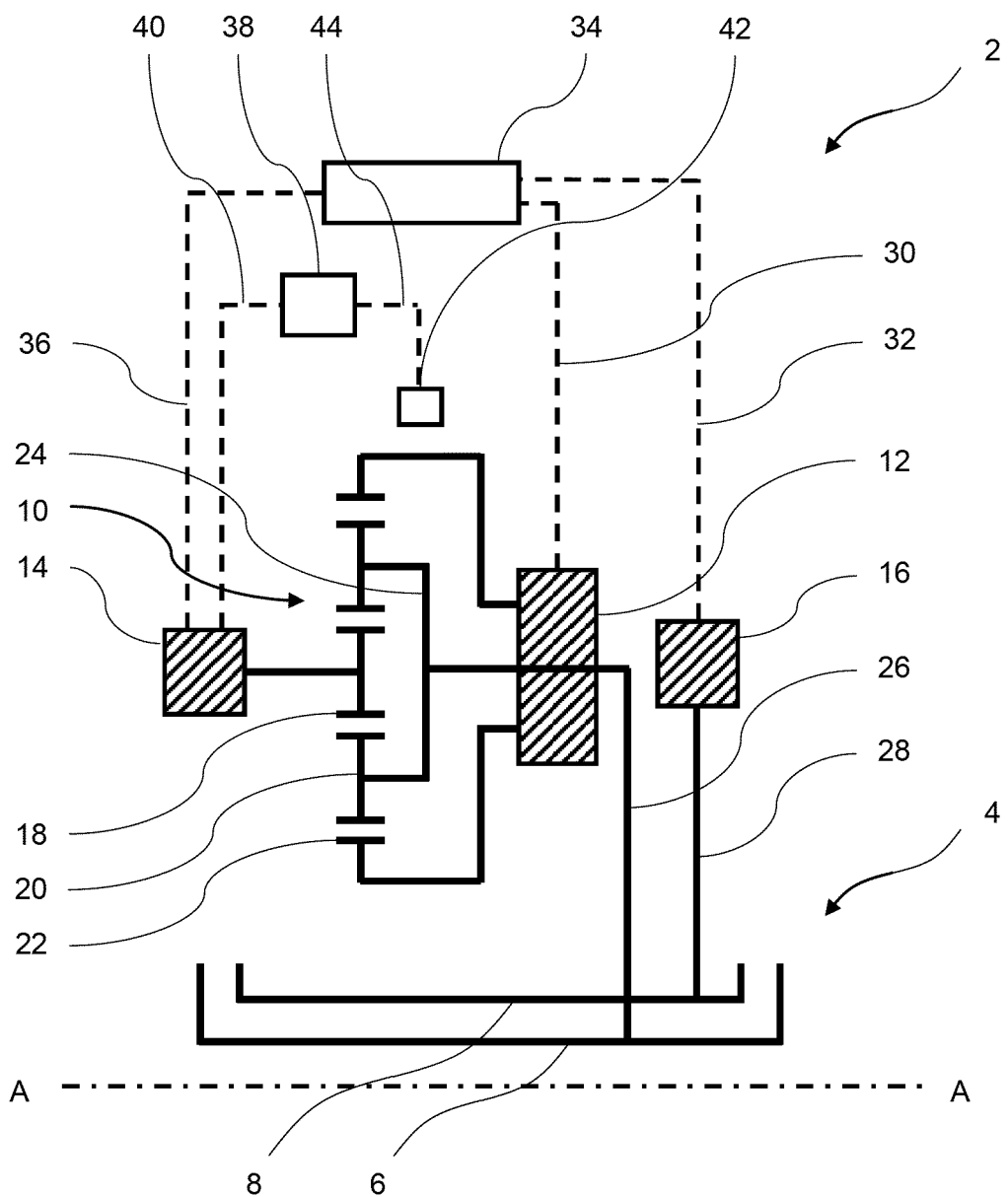
FIG. 1 shows a schematic view of an electrical power-transfer system in accordance with an embodiment of the present disclosure.

FIG. 1 shows an electrical power-transfer system 2 in accordance with an embodiment of the present disclosure. The power-transfer system 2 is connected to a gas turbine engine 4, and specifically to a low speed, or low pressure (LP), shaft 6 and a high speed, or high pressure (HP) shaft 8 of the engine 4.

The power-transfer system 2 may be formed as part of the engine 4, so that all of the constituent parts of the power-transfer system 2 positioned within or integrated with the engine 4, such as by being located in a bypass nacelle or a core nacelle of the engine 4. Alternatively, as described in more detail below, one or more parts of the power-transfer system 2 may be separate to the engine 4, for example comprising part of an aircraft associated with the engine 4.

Each of the LP shaft 6 and HP shaft 8 may comprise an associated turbine section and compressor section, i.e. forming a low pressure turbine and compressor and a high pressure turbine and compressor. The engine 4 may further comprise a propulsor, for example a fan, which may form part of the LP shaft 6 or may form part of a separate fan shaft, for example which is connected with the LP shaft via a geared architecture, or which forms a third shaft as part of a three-spool engine. Alternatively, the engine 4 may be a land-based gas turbine engine without a propulsor.

In the embodiment shown, the LP shaft 6 and the HP shaft 8 are concentric about an axis A, the HP shaft 8 forming an annulus around the LP shaft 6. In alternative arrangements, the two shafts may be separate; for example, the first and second shafts may form part of respective, separate first and second gas turbine engines of a rotorcraft.

The power-transfer system 2 comprises a planetary gear system 10, a first electrical machine 12, a second electrical machine 14 and a third electrical machine 16. The power-transfer system 2 acts to transfer power from one of the LP shaft 6 and the HP shaft 8 to the other using the gear system 10 and the electrical machines 12, 14, 16, as will be described below.

The gear system 10 comprises a sun gear 18, a plurality of planetary gears 20, a ring gear 22, and a carrier 24. An outer surface of the central sun gear 18 comprises gear teeth which are enmeshed with gear teeth of the surrounding planetary gears 20. An inner surface of the ring gear 22 comprises gear teeth with are similarly enmeshed with the gear teeth of the planetary gears 20. The planetary gears 20 are each rotatably received on pinions of the carrier 24. The carrier 24 itself is further rotatable around rotational axis shared with the sun gear 18 and the ring gear 22.

The carrier 24 is connected to the LP shaft 6 in order to be driven in rotation by thereby. In the example shown, the carrier 24 is driven via a first, or LP, take-off shaft 26. The take-off shaft 26 is connected to the LP shaft 6 mechanically, for example via a gearbox at one end of the take-off shaft 26, so that rotation of the LP shaft 6 causes rotation of the take-off shaft 26. The take-off shaft 26 is connected to the carrier 24, for example by another gearbox at an opposed end of the take-off shaft 26, so that rotation of the take-off shaft 26 causes rotation of the carrier 24. The carrier 24 may comprise an input shaft in fixed connection therewith, the take-off shaft 26 rotating the input shaft to rotate the carrier 24.

In alternative arrangements, the take-off shaft 26 may be omitted, and the carrier 24 may be concentric with LP shaft 6 about the axis A to be driven by a direct or geared connection.

Rotation of the carrier 24 causes the planetary gears 20 to move around the sun gear 18, the movement facilitated by rotation of the planetary gears about their respective pinions. The movement of the planetary gears 20 causes a rotation of the ring gear 22.

The ring gear 22 is, in turn, connected to drive the first electrical machine 12 so as to generate electrical power. Rotational power from the LP shaft 6 may therefore be transferred, via the carrier 24, planetary gears 20, and ring gear 22, to drive the first electrical machine 12.

The first electrical machine 12 comprises an associated electrical connection 30 which, in the example shown, connects the first electrical machine 12 to an electrical system 34. The electrical system 34 may comprise, for example, power electronics and/or electrical storage such as a battery. The electrical system 34 may be part of the engine 4, or may be fully or partially located on an aircraft associated with the engine 4. For example, the electrical system may be, or may include, an aircraft main bus.

In alternative arrangements, ones of the first, second and third electrical machines 12, 14, 16 may be electrically connected to one another directly, without passing through a central electrical system of the engine 4 or an associated aircraft.

The power-transfer system 2 further comprises a third electrical machine 16 which is connected to the HP shaft 8 so as to drive rotation thereof. In the example shown, the carrier 24 is driven via a second, or HP, take-off shaft 28. The take-off shaft 28 is connected to the HP shaft 8 mechanically, for example via a gearbox at one end of the take-off shaft 28, so that rotation of the take-off shaft 28 causes rotation of the HP shaft 8. The take-off shaft 28 is connected to the third electrical machine 16, for example by another gearbox at an opposed end of the take-off shaft 28, so that the third electrical machine 16 may drive rotation of the take-off shaft to, in turn, apply power to the HP shaft 8.

In alternative arrangements, the take-off shaft 28 may be omitted, and the third electrical machine 16 may be positioned adjacent or surrounding the HP shaft 8 to directly apply power thereto.

The third electrical machine 16 comprises an associated electrical connection 32 which, in the example shown, connects the third electrical machine 16 to the electrical system 34. The electrical system 34 may thereby power the third electrical machine.

In the manner described above, rotational power from the LP shaft 6 may be transferred to the HP shaft 8 via conversion to electrical power, with the first electrical machine 12 acting as a generator and the third electrical machine 16 acting as a motor. In certain arrangements, one or both of the first electrical machine 12 and the third electrical machine 16 may comprise motor-generators, allowing power to be applied to the LP shaft 6 and/or generated by the HP shaft 8. If both first and third electrical machines 12 and 16 comprise motor-generators, the power-transfer system 2 may be operable to transfer power from the HP shaft 8 to the LP shaft 6 in a process mirroring that which is described above.

In examples, the power-transfer system 2 may be operable through substantially all operating conditions of the engine 4 and associated engine shafts 6, 8. In one example, the power-transfer system 2 may be operable during a descent or idle condition of the engine 4 to transfer power from the LP shaft 6 to the HP shaft 8 and change the speeds of the shafts 6, 8 so as to change a compressor surge margin. In another example, power may be transferred following a flame-out of the engine 4 from a windmilling LP shaft 6 to apply power to the HP shaft 8 and re-start the engine 4. In yet further examples, the power-transfer system 2 may be operated during cruise, or design-point, condition, or at maximum red-line condition such as at take-off, to increase engine efficiency at those conditions.

In order to transfer power across varied operating conditions of the engine 4, it may be necessary for the power-transfer system 2 to operate efficiently at a wide range of speeds of the shafts 6 and 8. In particular, low pressure shafts of gas turbine engines can be required to operate over a very wide range of rotational speeds which must be accommodated by a power-transfer system.

The relative efficiency of electrical machines, however, can be highly dependent on the speed of rotation of the input or output, with the machine designed to operate most efficiently at a small range of speeds. For this reason, it may be desirable to constrain the range of rotation of mechanical inputs to electrical machines in order to increase efficiency.

Furthermore, it has been found that electrical machines with wider ranges of efficient operation may be less power-dense, generating or applying less power for a given size and/or weight of the machine. Electrical machines may be defined in part by their constant power speed range (CPSR), which can be expressed as a ratio of the minimum and maximum of a range of speeds at which the machine operates at substantially maximum efficiency; electrical machines with higher CPSRs may be less efficient overall due to reduced power density, while electrical machines with lower CPSRs may have a greater power density, but operate efficiently only in a small range of speeds. It has been found that, in engines where weight is of particular concern, such as gas turbine engines for aircraft, this trade-off of electrical machine efficiency versus power density can limit the utility of an electrical power-transfer system.

To this end, the electrical power-transfer system 2 is operable to regulate a speed of input to the first electrical machine 12 relative to the input, LP shaft 6. This regulation is implemented by control of the sun gear 18 by the second electrical machine 14. Regulating a speed of input to the first electrical machine 12 allows more flexibility in the design of power-transfer system 2, and in particular can enable the use of more power dense components which might have narrower ranges of efficient operation.

In one mode of operation, when the sun gear 18 is fixed, rotation of the carrier 24 causes a rotation of the ring gear 22 in the same direction at a faster speed. The ratio of the rates of rotation of the carrier 24 and the ring gear 22 are a function of the number of gear teeth of the sun gear 18 and the ring gear 22 according to equation 1:

$$\frac{W_r}{W_c} = 1 + \frac{N_s}{N_r} \quad (1)$$

where $W_r$ is the rotating speed of the ring gear, $W_c$ is the rotating speed of the carrier, $N_s$ is the number of gear teeth of the sun gear and $N_r$ is the number of gear teeth of the ring gear. In one example, a planetary gear system 10 may have $N_s=24$ and $N_r=56$ so that the ring gear 22 turns at approximately 1.43 times the speed of the carrier 24.

If the sun gear 18 is rotated in the same direction as the carrier 24, then the speed of rotation of the ring gear 22 relative to the carrier 24 is decreased; similarly, if the sun gear is counter rotated relative to the carrier 24, then the speed of rotation of the ring gear 22 relative to the carrier 24 is increased. Effectively, rotation of the sun gear 18 changes the gear ratio of the planetary gear system 10. The relationship in speeds is governed by equation 2:

$$W_S = \frac{N_s + N_r}{N_s} W_c - \frac{N_r}{N_s} W_r \quad (2)$$

where $W_s$ is the rotating speed of the sun gear.

Figure 2:
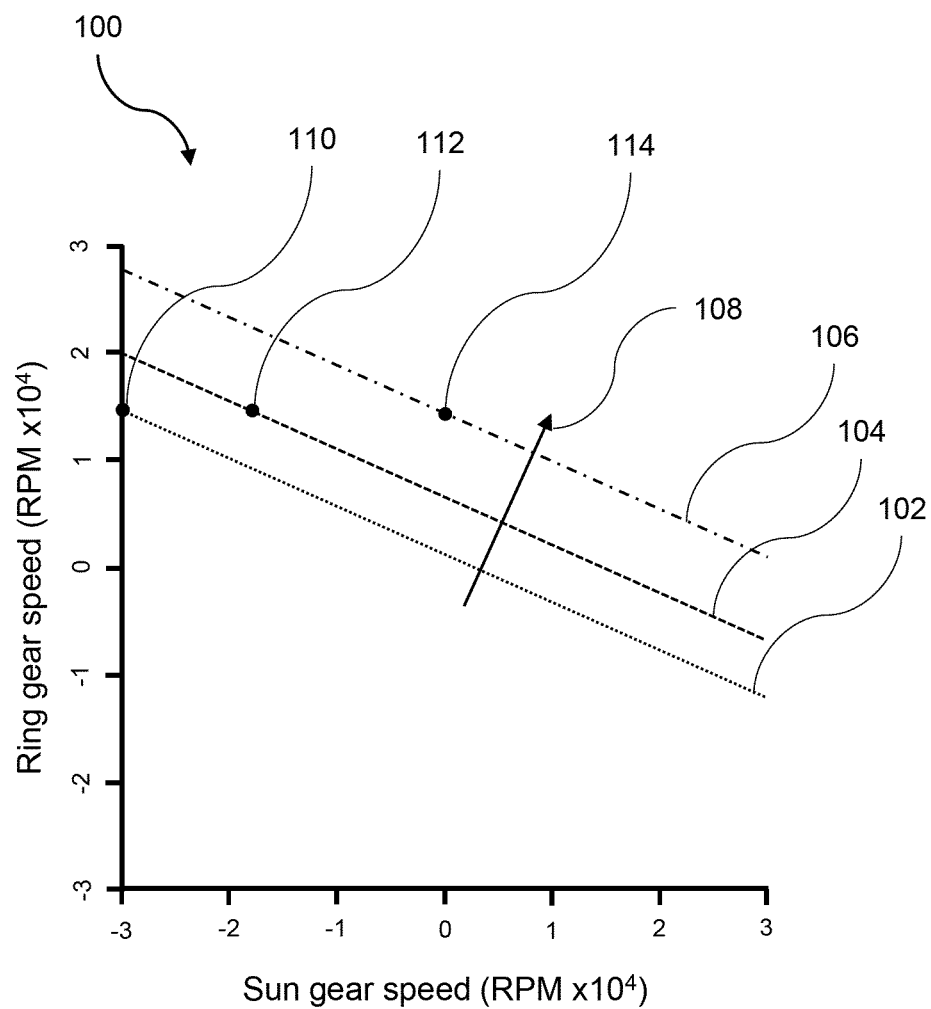
FIG. 2 shows a graph illustrating the relationship between sun gear speed and ring gear speed at different carrier speeds.

FIG. 2 shows a graph 100 illustrating the relationship between sun gear speed and ring gear speed at different carrier speeds in the example where $N_s=24$ and $N_r=56$. Line 102 shows the relationship at a carrier speed of 1000 RPM, line 104 shows the relationship at a carrier speed of 5000 RPM, and line 106 shows the relationship at a carrier speed of 10,000 RPM. Line 108 shows the general trend line of increasing carrier speed.

Graph 100 illustrates the manner in which sun gear speed may be controlled in order to regulate a ring gear speed to a substantially constant value. In an example, the gear speeds may be controlled to constrain the ring speed at 14,000 RPM. Points 110, 112 and 114 on respective lines 102, 104 and 106 show the sun gear speed which is set for the carrier speeds 1000 RPM, 5000 RPM and 10,000 RPM in order to set the ring gear speed as 14,000 RPM.

Returning to FIG. 1, the sun gear 18 of the planetary gear system 10 is connected to be driven by the second electrical machine 14. The second electrical machine 14 is controllable to drive the sun gear 18 in one or both rotational directions in order to regulate a speed of the ring gear 22. The speed of the ring gear 22 can be regulated to maintain a substantially constant ring gear speed while the speed of the carrier 24 varies throughout the range of operational speeds of the LP shaft 6.

The second electrical machine 14 comprises an associated electrical connection 36 which, in the example shown, connects the second electrical machine 14 to the electrical system 34. The electrical system 34 may thereby power the second electrical machine 14.

In some examples, control of the second electrical machine 14 may be effected by a controller 38. The controller 38 is in communication with the second electrical machine 14, for example via a signal connection 40. The controller 38 controls the second electrical machine 14 to drive the sun gear 18 at a desired speed in order to set a desired speed of the ring gear 22, for example to regulate the ring gear 22 to a substantially constant speed.

The controller 38 may form part of the engine 4, or may be part of an aircraft associated with the engine 4. The controller 38 may be an independent controller, or may be part of a wider control system such as a full-authority digital engine control (FADEC) system of the engine 4.

A sensor 42 may be provided which is in communication with the controller 38, for example via a signal connection 44. The sensor 42 is operable to detect a rotation of one or more parts of the planetary gear system 10. The sensor 42 may directly detect the rotation of one of the parts such as the carrier 24, planetary gears 20 or ring gear 22, or may detect rotation speed of the planetary gear system 10 indirectly by detecting rotation of the LP shaft 6, take-off shaft 26 or carrier input shaft. A reading of the sensor 42 may then be utilised by the controller 38 to implement a feedback control of the second electrical machine 14 and sun gear 18, whereby the second electrical machine 14 is controlled in response to the rotation detected by the sensor 42.

In one example, the controller 38 implements control of the second electrical machine 14 using a target speed look-up table where a detected signal value from the sensor 42 is compared to the target speed table to find an input value to be communicated to the sun gear 18. The use of a target speed table may be a particularly simple and effective form of control for maintaining a ring gear speed at a desired value.

In one example, the sensor 42 may be configured to detect a rotation of the ring gear 22. The sensor 42 may form part of the first electrical machine 12, for example, and arranged to directly sense the input rotational speed of the connected ring gear. Using a sensor associated with the ring gear may be particularly effective as such a sensor may already be required for commutation control of the power generated by the first electrical machine 12.

Figure 3A:
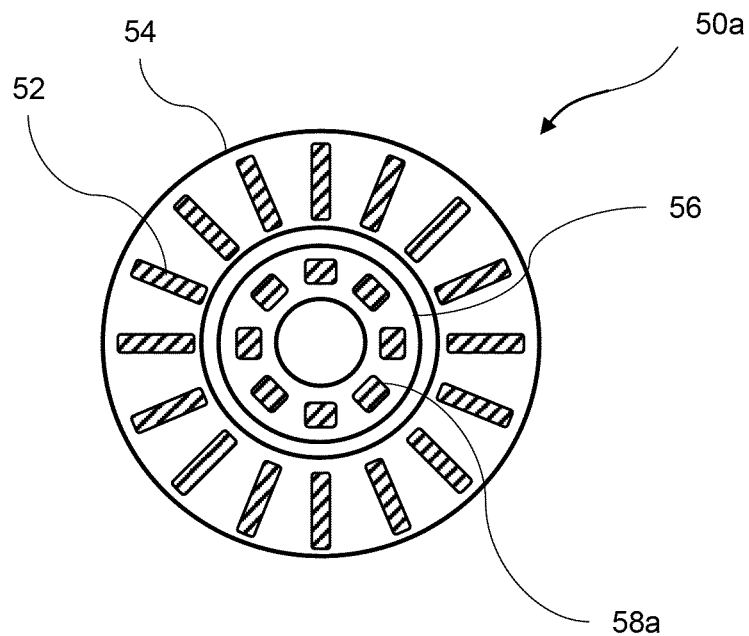
FIG. 3A shows a cross-sectional view of a first example electrical machine.

FIG. 3A shows an example electrical machine which is an interior permanent magnet machine 50a. The interior permanent magnet (IPM) machine 50a comprises an armature 52 fixed to a stator 54, and a rotor 56, and a plurality of permanent magnets 58a attached to an interior surface of the rotor 56. Turning of the rotor 56 within the stator 54 causes magnetic fields of the permanent magnets 58a generate a current within the armature 52. In an inverse mode, the current in the armature 52 can be controlled to cause the rotor 56 to turn.

Figure 3B:
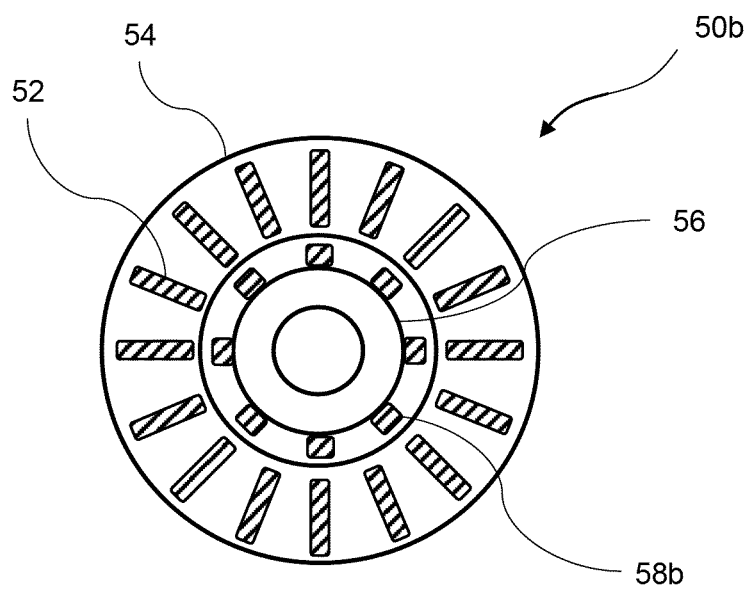
FIG. 3B shows a cross-sectional view of a second example electrical machine.

FIG. 3B shows another example electrical machine which is a surface permanent magnet (SPM) machine 50b. The SPM machine 50b is similar to the IPM machine 50a in comprising an armature 52 fixed to a stator 54, and a rotor 56, but differs by comprising a plurality of permanent magnets 58b attached to an exterior surface of the rotor 56 instead of the interior surface.

The example electrical machines comprise different CPSRs for a given size of stator and rotor, with the IPM machine having a greater CPSR than a similar-sized SPM machine. It has been found, however, that the use of SPM machines may be preferable in applications where weight is influential on overall efficiency, because SPM machines have a greater power density, and are capable of generating a greater amount of power for a given size.

Returning to FIG. 1, with continued reference to FIGS. 3A and 3B, one example embodiment may include a first electrical machine 12 which comprises an SPM machine such as the example machine shown in FIG. 3B. The use of an SPM machine can allow a large amount of power to be efficiently generated from the ring gear 22, which can be regulated to a substantially constant speed, or to within the CPSR of the SPM.

Alternatively or additionally, example embodiments may include a third electrical machine 16 which comprises an SPM machine such as the example machine shown in FIG. 3B. While this results in a third electrical machine 16 having a reduced CPSR, the machine may be particularly effective in driving shafts such as the HP shaft 8 of the engine 4 which, despite operating at greater absolute speeds than LP shaft 6, experience less variations in speed during normal operation.

Alternatively or additionally, example embodiments may include a second electrical machine 14 which comprises an IPM machine such as the example machine shown in FIG. 3A. The use of an IPM machine, which may comprise a relatively large CPSR, can allow the sun gear 18 to be driven at a wide range of speeds in order to regulate the speed of the ring gear 22 effectively for a wider range of input speeds of the carrier 24. Although the IPM may be comparatively less power-dense and more inefficient, the overall efficiency of the power-transfer system may be increased by the use of an IPM to drive the sun gear 18, because the sun gear 18 is subject to only a small degree of the total torque of the planetary gear system 10; inefficiencies of the second electrical machine 14 may therefore have a relatively small effect on the system as a whole. The toque relationship between the gears of the planetary gear system 10 is governed by equation 3:

$$T_c = -T_r \frac{N_r + N_s}{N_r} = -T_s \frac{N_r + N_s}{N_s} \qquad (3)$$

where $T_c$ is the torque on the carrier 24, $T_r$ is the torque on the ring gear 22, and $T_s$ is the torque on the sun gear 18.

Figure 4:
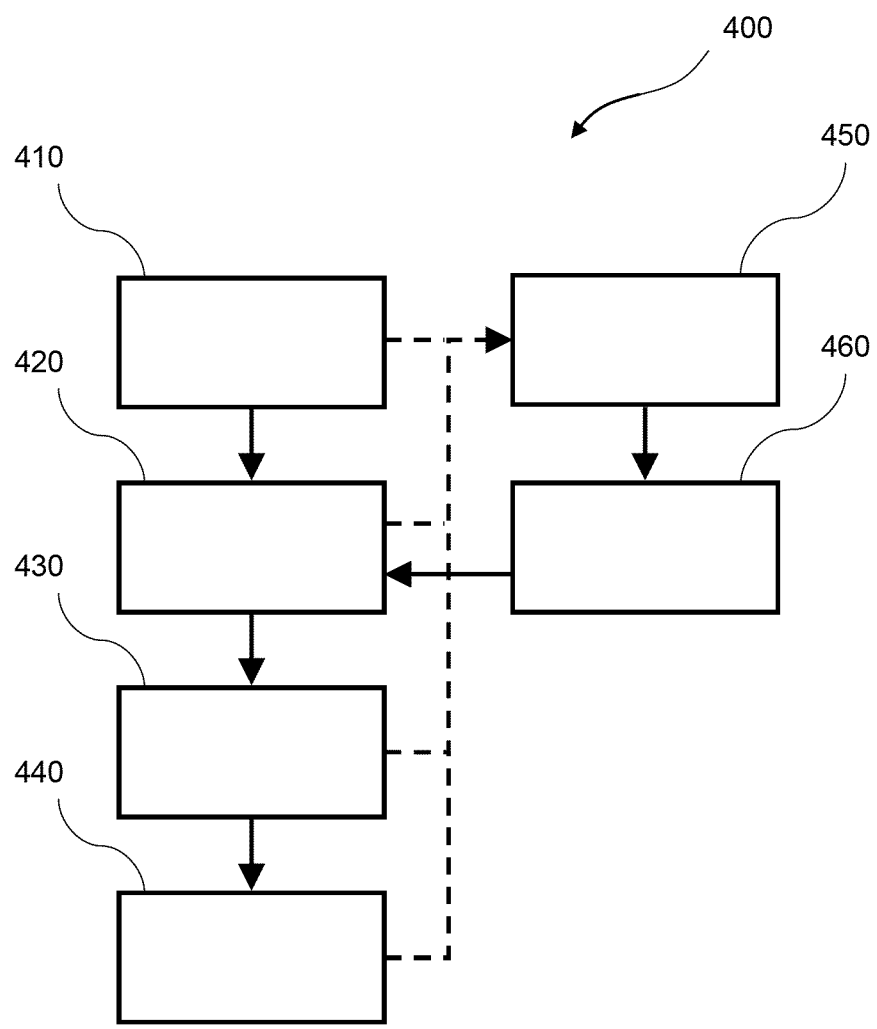
FIG. 4 shows a flowchart of an example method.

FIG. 4 shows an example method 400 for operating an electrical power-transfer system, which may be the electrical power-transfer system in the form described in any of the above.

The method comprises a step 410 of driving a carrier of a planetary gear system with a first engine shaft. The driving of the carrier may be via a take-off shaft and/or associated gearboxes, as described above. The step of driving the carrier results in driving the planetary gears to move around a central, enmeshed, sun gear. Driving the planetary gears results in driving a surrounding, enmeshed, ring gear.

The method further comprises a step 420 of driving the sun gear with a second electrical machine connected to the sun gear. Driving the sun gear results in controlling the speed of the ring gear relative to the carrier, as described above.

The method further comprises a step 430 of generating electrical power with a first electrical machine connected to the ring gear. The driving of the sun gear allows the speed of the first electrical machine to be controlled, as described above.

The method further comprises a step 440 of powering a third electrical machine with the generated electrical power. The third electrical machine acts as a motor on a second engine shaft, so that powering the third electrical machine drives the second engine shaft.

The method may further comprise a step 450 of detecting a rotation of one or more parts of the planetary gear system with a sensor. In one example, the method may comprise detecting a rotation of the ring gear.

The method may further comprise a step 460 of controlling a speed at which the sun gear is driven, based on and/or in response to the detected rotation. For example, the step may comprise using a controller to determine an input for the second electrical machine based on the detected rotation, in one particular example by using a look-up table, and sending the input to the second electrical machine.

It will be understood that the method steps may be carried out in the order described above, or a different order appropriate to carrying out power-transfer between the engine shafts. For example, the step of detecting rotation and/or controlling the speed of the sun gear may be carried out continuously or repeatedly while carrying out any or all of the other steps.

The above embodiments are illustrative examples of the invention, and further embodiments of the invention are envisaged. It is to be understood that any feature described in relation to any one embodiment may be used alone, or in combination with other features described, and may also be used in combination with one or more features of any other of the embodiments, or any combination of any other of the embodiments. For these reasons, the following claims should be studied to determine the true scope and content of this disclosure.

What is claimed is:

1. An electrical power-transfer system for an engine having first and second engine shafts, the system comprising:
    a planetary gear system comprising a sun gear, a ring gear, a plurality of planetary gears enmeshed with the sun gear and the ring gear, and a carrier supporting the plurality of planetary gears, wherein the carrier is configured for connection to be driven by the first engine shaft;
    a first electrical machine connected to be driven by the ring gear to generate electrical power;
    a second electrical machine connected to drive the sun gear;
    a third electrical machine configured to receive the electrical power generated by the first electrical machine and operable as a motor to drive the second engine shaft;
    a sensor configured to detect a rotation of one or more parts of the planetary gear system; and
    a controller in communication with the sensor, the controller configured to control a speed at which the second electrical machine drives the sun gear in response to the rotation detected by the sensor.

2. The system of claim 1, wherein the second electrical machine has a constant power speed range that is greater than a constant power speed range of the first electrical machine.

3. The system of claim 2, wherein the first electrical machine is a motor-generator.

4. The system of claim 3, wherein the first electrical machine comprises a surface permanent magnet machine.

5. The system of claim 3, wherein the second electrical machine comprises an interior permanent magnet machine.

6. The system of claim 1, wherein the third electrical machine is a motor-generator.

7. The system of claim 6, wherein the third electrical machine comprises a surface permanent magnet machine.

8. The system of claim 1, wherein the sensor is configured to detect the rotation of the one or more parts of the planetary gear system indirectly by detecting rotation of one of the engine shafts.

9. The system of claim 1, wherein the sensor is configured to detect a rotation of the ring gear.

10. A gas turbine engine comprising:
    a low-speed shaft;
    a high-speed shaft; and
    an electrical power transfer system comprising:
        a planetary gear system comprising a sun gear, a ring gear, a plurality of planetary gears enmeshed with the sun gear and the ring gear, and a carrier supporting the plurality of planetary gears, the carrier connected to be driven by the low-speed shaft;
        a first electrical machine connected to be driven by the ring gear to generate electrical power;
        a second electrical machine connected to drive the sun gear; and
        a third electrical machine configured to receive the electrical power generated by the first electrical machine and connected to drive the high-speed shaft;
    wherein the second electrical machine has a constant power speed range that is greater than a constant power speed range of the first electrical machine.

11. The gas turbine engine of claim 10, wherein each constant power speed range is expressed as a ratio of a minimum and a maximum of a range of speeds at which the associated electrical machine operates at substantially maximum efficiency.

12. The gas turbine engine of claim 10, wherein the first electrical machine comprises a surface permanent magnet machine.

13. The gas turbine engine of claim 12, wherein the second electrical machine comprises an interior permanent magnet machine.

14. The gas turbine engine of claim 13, further comprising:
    a sensor configured to detect a rotation of one or more parts of the planetary gear system; and
    a controller in communication with the sensor, the controller configured to control a speed at which the second electrical machine drives the sun gear in response to the rotation detected by the sensor.

15. The gas turbine engine of claim 14, wherein the third electrical machine is a motor-generator.

16. The gas turbine engine of claim 10, wherein the carrier is connected to be driven by the low-speed shaft via a take-off shaft.

17. The gas turbine engine of claim 10, wherein the third electrical machine is connected to drive the high-speed shaft via a take-off shaft.

18. A method of operating an electrical power transfer system of an engine having first and second engine shafts, the method comprising:
    driving a carrier of a planetary gear system with the first engine shaft, the carrier supporting a plurality of planetary gears enmeshed with a sun gear and a ring gear, the ring gear connected to drive a first electrical machine and the sun gear connected to be driven by a second electrical machine;
    driving the sun gear with the second electrical machine;
    generating electrical power with the first electrical machine;
    powering, with the electrical power, a third electrical machine in order to drive the second engine shaft;
    detecting, using a sensor, a rotation of one or more parts of the planetary gear system; and
    controlling, using a controller in communication with the sensor, a speed at which the second electrical machine drives the sun gear in response to the detected rotation.

19. The method of claim 18, wherein the second electrical machine has a constant power speed range that is greater than a constant power speed range of the first electrical machine.

20. The method of claim 18, wherein:
    the engine is a gas turbine engine;
    driving the carrier with the first engine shaft comprises driving the carrier with a low-speed shaft of the gas turbine engine; and powering the third electrical machine in order to drive the second engine shaft comprises powering the third electrical machine in order to drive a high-speed shaft of the gas turbine engine.

* * * * *